United States Patent [19]

Poikela

[11] Patent Number: 4,625,083

[45] Date of Patent: Nov. 25, 1986

[54] VOICE OPERATED SWITCH

[76] Inventor: Timo J. Poikela, Haavurintie 2, 25250 Märynummi, Finland

[21] Appl. No.: 718,950

[22] Filed: Apr. 2, 1985

[51] Int. Cl.⁴ .............................................. H04M 1/60

[52] U.S. Cl. ................................... 379/389; 367/199; 381/46; 381/71

[58] Field of Search .................... 179/81 B, 100 L, 37, 179/81 R; 381/110, 57, 46, 94, 122

[56] References Cited

U.S. PATENT DOCUMENTS

| | | | |
|---|---|---|---|
| 3,588,360 | 6/1971 | Knox | 179/81 B |
| 3,751,602 | 8/1973 | Breeden | 179/81 B |
| 3,849,603 | 11/1974 | Proios | 179/37 |
| 4,006,310 | 2/1977 | Bayer | 179/37 |

*Primary Examiner*—James L. Dwyer

*Attorney, Agent, or Firm*—Darby & Darby

[57] ABSTRACT

A voice operated switch for use in noisy environments is described. The switch includes independent amplifiers for separately amplifying frequency band limited speech and noise signals. The independently amplified speech and noise signals are rectified, applied through time constant circuits, and are applied to a differential amplifier. Variations in the resulting signal are detected to determine the present or absence of speech, and control pulses are generated. The control pulses operate a switch device.

7 Claims, 5 Drawing Figures

VOICE OPERATED SWITCH

BACKGROUND OF THE INVENTION

1. Field of the Invention

This invention relates to voice operated switches and more particularly to voice operated switches for controlling transmit-receive modes of loudspeaking telephones.

2. Description of the Prior Art

In many situations where it is desirable to use voice operated switches, ambient noise conditions preclude or hamper the use of such switches. These situations include the use of voice activated machinery in workshops, near printing presses, in typewriting rooms, and the like, and especially the use of voice operated switches to control the transmit-receive modes of loudspeaking telephones, or mobile telephones in automobiles, trains, or ships. One particular problem is that certain noises such as, for example, automobile engine noise during sudden acceleration, or automobile chassis noise when driving over potholes, have sound pressure level characteristics which resemble human RMS speech signals.

One prior solution to the problem was to place the speech microphone very close to the mouth. This improved voice intelligibility despite high ambient noise levels, but seriously restricted the speaker's freedom of movement. At sufficiently high ambient noise levels, this arrangement completely failed to distinguish voice from noise levels.

Another previous solution was the use of a so-called noise microphone placed some distance from the speech microphone. Only the signal resulting from subtracting the noise level from the voice level was used. This system performed well only under ideal conditions, i.e., in environments free from acoustic reflections. Where acoustic reflections were present, the voice level often appeared on the noise level, and the subtraction eliminated the voice signal altogether.

Yet another approach was to rectify the signal from the microphone and compare the minimum and maximum levels with the minimum and maximum levels of the receiving party's signals from the receiver. This technique satisfactorily eliminated the effects of high level background noise, but failed to adequately distinguish voice from noise when the noise levels fluctuated in a manner resembling the RMS component of speech.

These and other prior solutions are shown, for example, in Bertholon U.K. Patent Application No. GB2,003,002 A, filed Feb. 28, 1974, for Detecting Speech In The Presence Of Noise, in which a speech detector circuit closes a transmission switch when the energy content of a sound burst measured over a period not exceeding 100 ms exceeds the ambient noise level by more than a predetermined threshold. This circuit does not adequately distinguish between voice sound bursts and noise sound bursts resembling the RMS component of speech signals.

Breeden, U.S. Pat. No. 3,751,602, issued Aug. 7, 1973, shows a control circuit to achieve complementary switched gain in the transmit and receive channels of a loudspeaking telephone. Only one microphone is employed, however, and even with optimal selection of the noise rectifier and time constant circuits, the control circuit still does not adequately distinguish between voice and RMS resembling noise levels.

OBJECTS OF THE INVENTION

Broadly, an object of this invention is to provide an improved voice operated switch for use in noisy environments. Specifically, an object is to provide a voice operated switch which reliably distinguishes between speech signals and ambient noise signals having RMS components which resemble the RMS components of speech.

Another object of the invention is to provide an improved circuit for comparing at least two input signals to generate control signals.

Yet another object of the invention is to provide an improved circuit for a voice operated switch which adjusts sensitivity of the switch according to ambient noise levels.

Still another object of the invention is to provide a voice operated switch for improving talk-down operation of loudspeaker telecommunications apparatus.

SUMMARY OF THE INVENTION

The objects of the invention are achieved in a voice operated switch employing two microphones, one being placed near the speaker's mouth and the other located so as to primarily receive ambient noise signals. Independent amplifier, automatic gain control (AGC), rectifier and time constant circuits are provided for each of the speech and noise microphones in order to produce a circuit signal corresponding to the actual RMS speech component. A level change detector circuit is employed to set and reset the particular device being switched. The level change detector circuit responds only to RMS signal level changes having a predetermined rate of change. The speech microphone, noise microphone, and in the case of loudspeaking telecommunications equipment, the loudspeaker, are located with respect to one another at predetermined distance relationships.

BRIEF DESCRIPTION OF THE DRAWINGS

The foregoing brief description, as well as additional objects, features and advantages of the present invention will be more completely understood from the following detailed description of a preferred, but nonetheless illustrative, embodiment of the invention, with reference being had to the accompanying drawings wherein.

DESCRIPTION OF THE PREFERRED EMBODIMENTS

Figure 1:
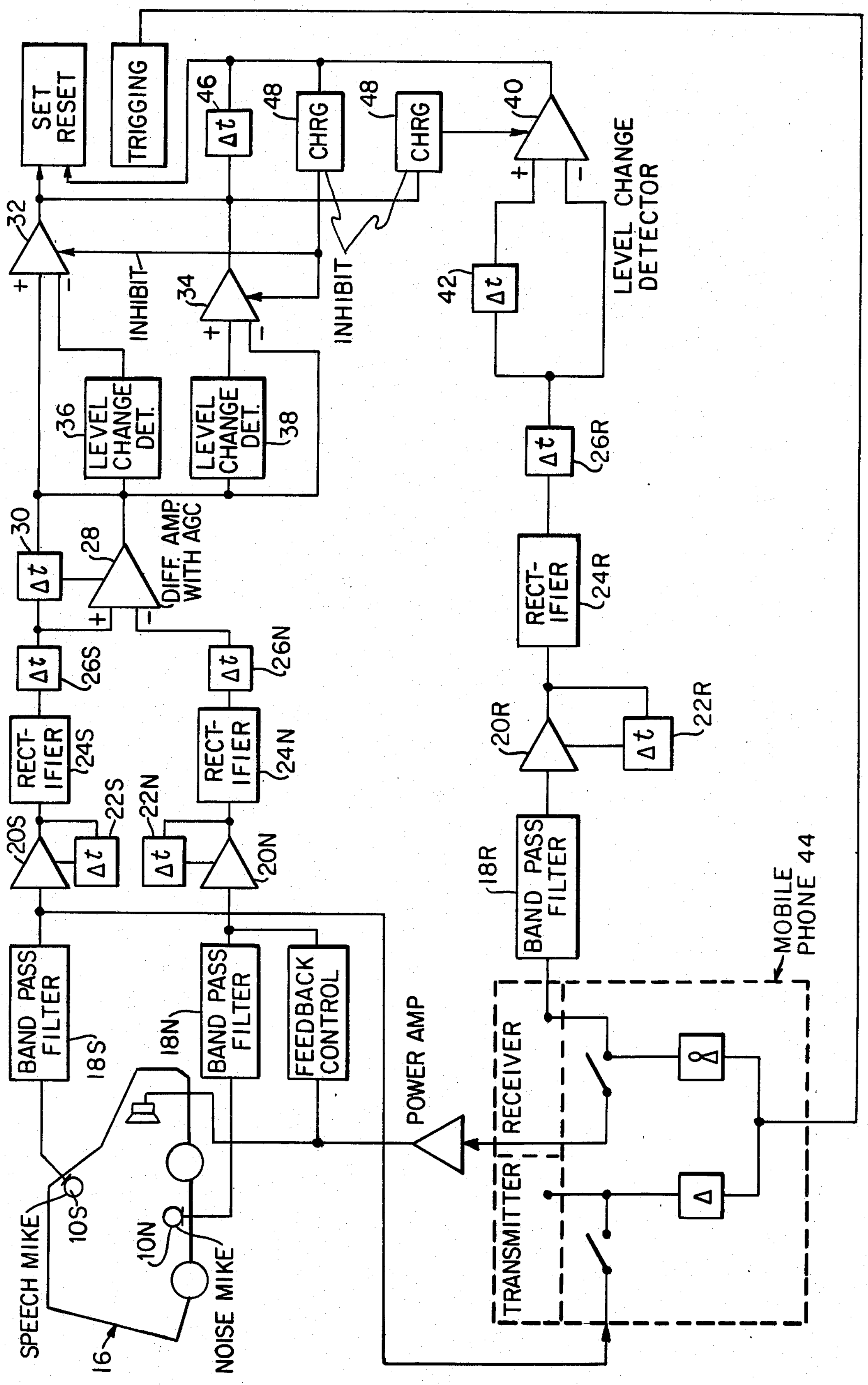
FIG. 1 is an overall block diagram of a circuit for a voice operated switch according to the present invention.

FIG. 1 shows a preferred, but nonetheless illustrative, embodiment of a voice activated switch circuit relating to a loudspeaking mobile telephone for use in an automobile, in block diagram format.

Variations in noise and speech sound pressure levels (SPL) in a moving vehicle may be categorized in distinct groups: slowly varying automobile noise during normal driving, instantaneous short duration peaks due to shocks and/or impacts, and rapid variations of longer duration due to speech. Noise SPL variations due to normal driving are generally in the range 20–100 dB, with periods usually exceeding 500 milliseconds. Noise SPL variations due to shocks are characterized by fast rise times and short durations, typically less than 100 milliseconds. Speech SPL variations are also characterized by fast rise times, but are typically of longer duration, on the order of 100 to 500 milliseconds.

Referring to the details of FIG. 1, a speech microphone 10S, noise microphone 10N, and loudspeaker 14 are shown in an automobile 16. In accordance with one aspect of the invention, these devices are located in a predetermined spatial relationship, for reasons made clear below. Essentially, the sound pressure level (SPL) of speech incident on the speech microphone 10S should exceed the SPL of ambient noise incident on the same speech microphone. This desired result may be achieved by placing the microphones in predetermined locations within the automobile, or by limiting the frequency pass band width of the microphone amplifiers. In this illustrative embodiment, both of these approaches are used. Since the frequency spectra of ambient noise in a moving vehicle and normal speech are similarly spread across the entire human audible range, with emphasis on lower frequencies, band pass filters 18S and 18N are applied to both the speech and noise inputs from the microphones 10S and 10N, respectively. A typical passband might be the range 100 hertz to 4 kilohertz. A narrower passband providing satisfactory results is the range 250 hertz to 3.5 kilohertz, which is a customary frequency passband utilized in telephone receivers.

After being frequency limited, the speech and noise signals are independently amplified by, for example, independent two-stage operational amplifiers 20S and 20N. The amplifiers have automatic gain control (AGC) circuitry 22S and 22N, operating with time constants of approximately 500 milliseconds. As noted above, SPL variations due to normal driving have durations usually exceeding 500 milliseconds. Thus, the AGC circuits eliminate speech and noise signal variations with periods exceeding 500 milliseconds. Speech signals pass through the time constant circuits unaltered, as the speed of variation is less than 500 milliseconds. In addition, the differences between SPL incident on the speech microphone 10S and SPL incident on the noise microphone 10N are effectively reduced.

The AGC circuits 22s and 22N are effective for sound levels of 60–80 db incident on the speech microphone 10S. In this particular example, automatic gain control is diminished above sound levels of 80 db, and is rendered inoperative when the sound level incident on speech microphone 10S is greater than 90 db. At noise levels above 90 db the speaker is naturally compelled to speak louder than the ambient noise, thus permitting speech detection as described below.

The speech and noise signals are rectified at 24S and 24N and then applied to additional independent time constant circuits 26S and 26N having suitably selected time constants to filter signal peaks and substantially instantaneous drops of less than 100 milliseconds duration. The resultant signals are the RMS speech signal, its SPL variations having durations in the range 100 to 500 milliseconds, and the RMS noise signal having SPL characteristics similar to RMS speech, i.e., variations of duration ranging from 100 to 500 milliseconds. Known prior art circuits could not adequately distinguish between these RMS signals, causing unwanted switching in response to noises other than speech.

Figure 2:
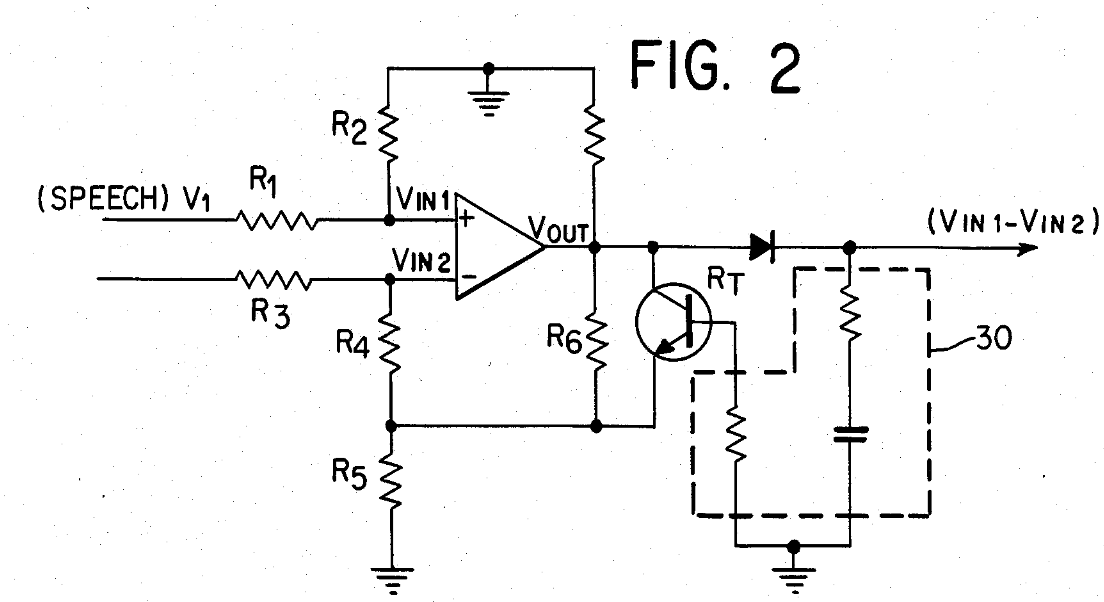
FIG. 2 is a schematic circuit diagram of the differential amplifier with automatic gain control shown in FIG. 1.

In order to differentiate speech from noise signals having RMS characteristics similar to speech RMS patterns, the speech and noise signals may be applied to a differential amplifier 28, in this case an operational amplifier having automatic gain control (FIG. 2). As shown in FIG. 2, the speech signal $V_1$ is applied to the non-inverting input and the noise signal $V_2$, having been independently frequency limited, amplified, smoothed, and rectified, is applied to the inverting input. The desired output of the differential amplifier is the difference of the input signal $V_{in1}$ (derived from speech signal $V_1$) and $V_{in2}$ (derived from the noise signal $V_2$). This output signal $V_{in1}-V_{in2}$) thus varies with the SPL incident primarily on the speech microphone (for variations of duration from 100–500 milliseconds). When a user of this voice operated switch is not speaking, the output signal from the differential amplifier is desired to be zero, so that this output signal can be used to detect the presence of speech.

The differential amplifier is provided with automatic gain control (AGC) because the relative rise in speech SPL above noise SPL decreases as the ambient noise level increases. AGC amplification is at a maximum, for example, when the difference is zero, and is at a minimum when speech and noise levels differ by, for example, 20 db. In this manner, the differential amplifier output signal level is suitable for use in the level change detector. Before level changes are detected, however, the AGC circuit additionally modifies the output signal with a time constant circuit 30 having a time constant of approximately one second. It is desirable for the differential amplifier response to be as fast as possible, in order to function at the speed of changes in ambient noise levels, yet not so fast as to affect the changing speech SPL. The time constant of one second is illustrative only, and other values meeting these criteria may be suitable.

In order to set and reset a voice operated switch according to the invention, control pulses are generated when the output signal level ($V_{in1}-V_{in2}$) from the differential amplifier 28 rises suddenly, and also when it falls suddenly. This may be accomplished with a pair of operational amplifiers 32,34 and associated time constant circuits 36,38. Referring to FIG. 2, the differential amplifier output signal is applied substantially instantaneously to the non-inverting input of the rise-detecting operational amplifier 32, and simultaneously through time constant circuit 33 to the inverting input of the same operational amplifier 32. The differential amplifier output signal is similarly applied substantially instantaneously to the non-inverting input of the fall-detecting operational amplifier 34 of FIG. 1, and simultaneously through a time constant circuit 36 to the inverting input of that operational amplifier.

Figure 3:
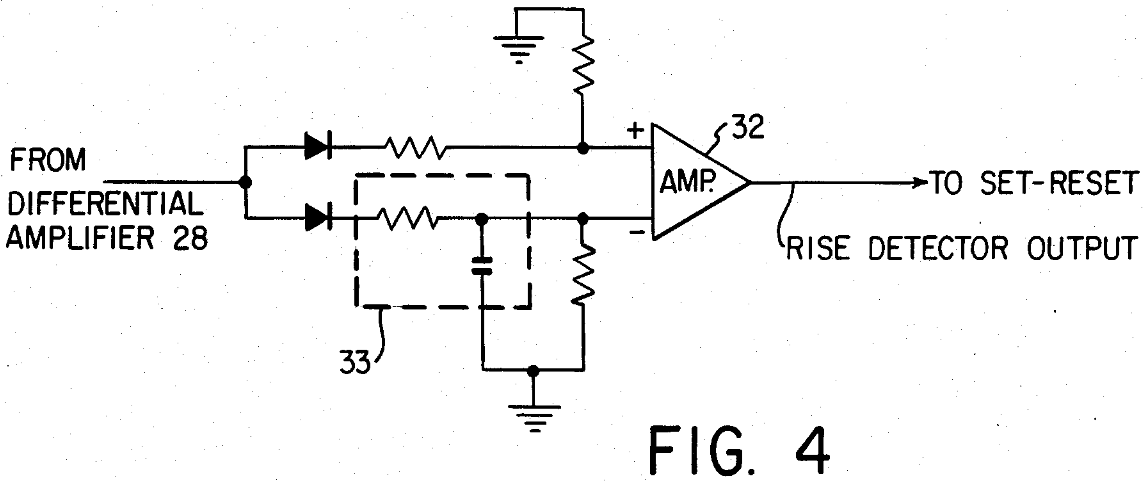
FIG. 3 is a schematic circuit diagram illustrating the principle of the level change detector shown in FIG. 1.

The operation of the circuit is explained with reference to FIG. 3. When the differential amplifier output level rises rapidly, a pulse is produced at the rise detector output, the duration of the pulse equal to the time delay of the time constant circuit of the inverting input. In general, for a more slowly rising signal, the pulse will have duration equal to the duration of the rise time plus the duration of the time delay. Similarly, when the differential amplifier output level falls rapidly, a pulse is produced at the output of the fall detector. In this fashion, useful control pulses are generated at substantially the moments at which a person using the voice operated switch starts and stops speaking.

In order to optimally control the transmit/receive state changing of a mobile telephone, control pulses indicating activity on the receiving line are generated. In much the same manner as for either the speech or noise signals, the signal received by the mobile telephone is frequency limited 18R, amplified 20R and 22R, smoothed 26R, and rectified 24R, as shown in FIG. 1. A single detector is shown in this particular illustrative example to detect rapid rises only, producing control pulses only for such rises in the received signal level. Simultaneous pules for opposing state changes (transmit-to-receive and receive-to-transmit) are inhibited by generating inhibit pulses from the set pulses produced by the speech level change detectors and applying these inhibit pulses to the inverting input of the receive detector operational amplifier 40, and from reset pulses produced by the receive level change detector and applying these inhibit pulses to the inverting input of both speech level change detector operational amplifiers 32 and 34.

Figure 4:
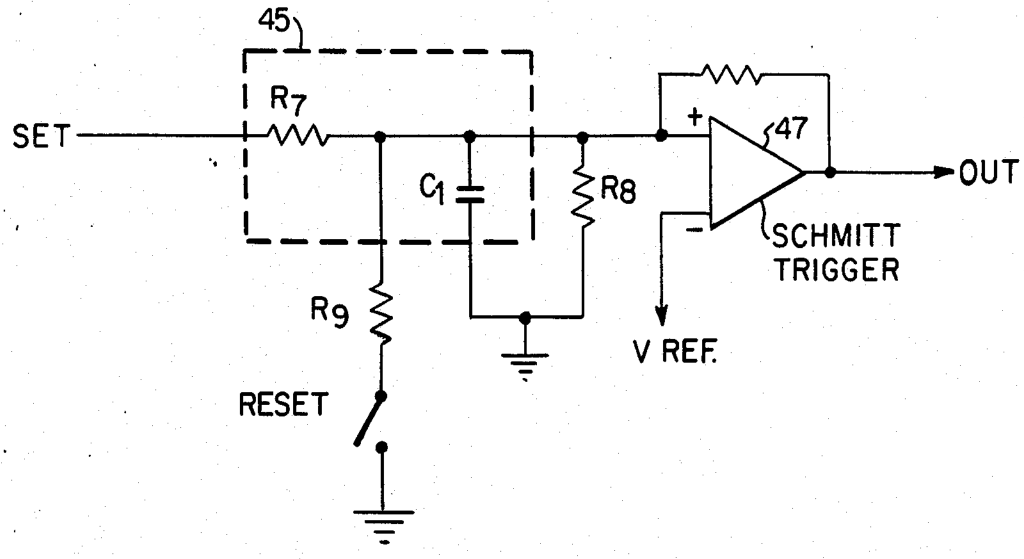
FIG. 4 is a schematic circuit diagram of the set-reset shown in FIG. 1.

Set-reset of the transmit/receive switch according to the present invention may be accomplished with a Schmitt Trigger circuit, as shown in FIG. 4. Whenever a set pulse appears at an output of either of the speech level rise and fall detectors, the Schmitt Trigger 47 output is driven high. The high output places the mobile telephone 44 in transmit mode, and may prevent operation of the loudspeaker 14. When set pulses are no longer produced at the speech level change detectors, time constant circuit 45 is employed to maintain the transmit state for a short period of time, typically three to four seconds, so long as reset pulses are not generated by the receive level change detector. This merely indicates that the normal standby mode for this illustrative switch is receive state.

Figure 5:
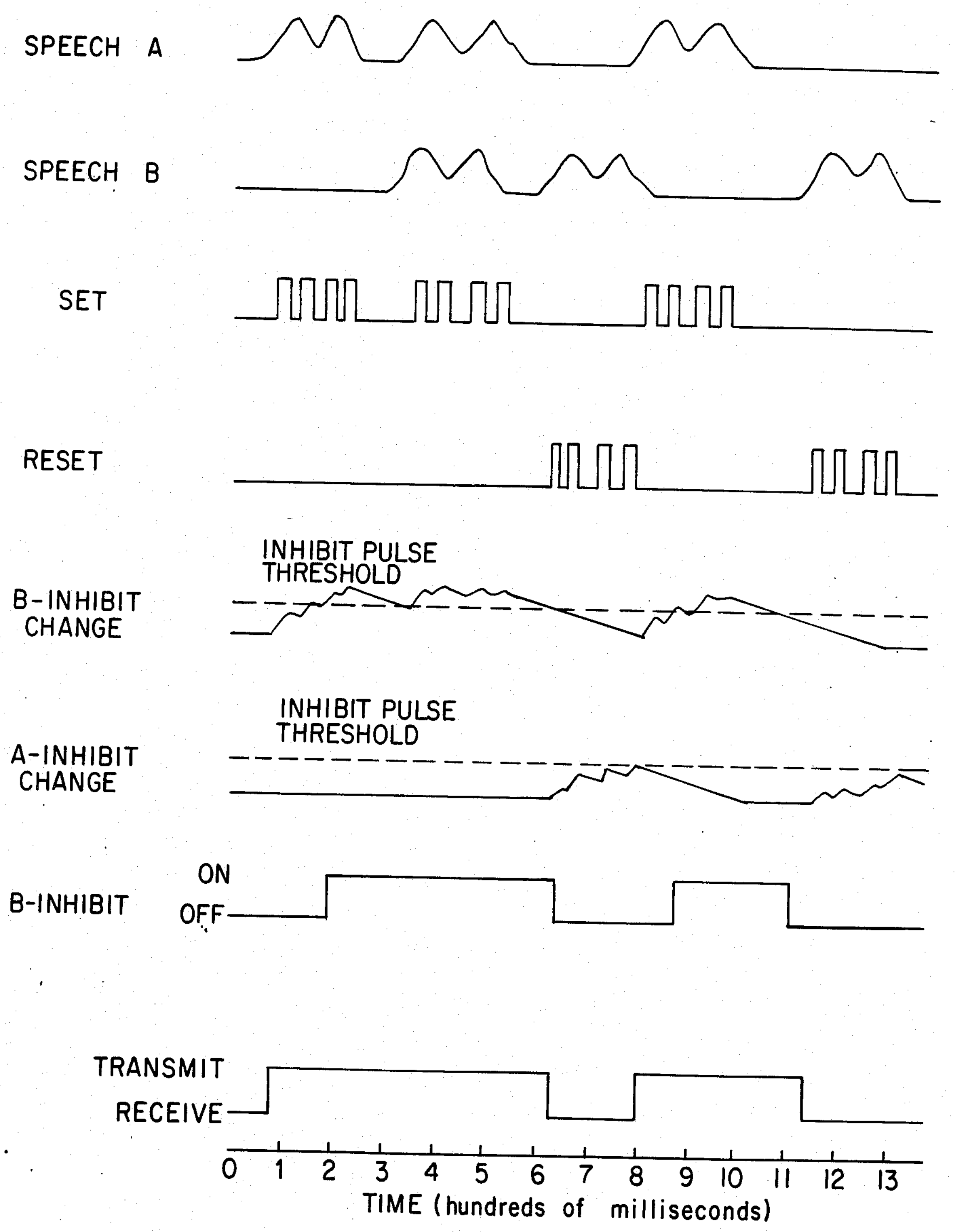
FIG. 5 is an illustration of the operation of the set-reset logic according to the present invention.

As previously mentioned, detector output pulses serve the additional purpose of inhibiting generation of simultaneous and conflicting pulses. For example, set pulses are applied through time constant circuit 46 to charge an inhibiting circuit 48. The inhibiting circuit produces an inhibiting pulse and applies it to the detector operational amplifier to be inhibited only when the inhibiting circuit is charged above a certain predetermined level. Since the charging process has a time delay, the inhibiting pulse lags the set pulses which caused it. Referring to FIG. 5, operation of the inhibition logic is shown. Looking first at the speech signal for Party A, the signal depicts a period of speech followed by a short pause, another period of speech, a longer pause, and a third period of speech. Party B is the remote party in this example. Before Party A begins to speak, the mobile telephone is in receive state, its quiescent mode. When Party A speaks, the rising speech signal causes a set pulse to be generated by the speech detector, causing the switch to change states to transmit mode (at 100 milliseconds on the time line). The rising and falling spech signal causes four set pulses. These pulses charge the inhibiting circuit until, at 200 milliseconds, the inhibiting circuit is sufficiently charged to generate a B-inhibit pulse, which remains high so long as the inhibiting circuit is so charged. This 100 millisecond delay is typical for the switch according to the invention. So long as the B-inhibit pulse is present, speech by Party B will not generate reset pulses.

When Party A pauses for the first time, the level of the inhibiting circuit charge begins to decay. Before the charge decays below the threshold level needed to maintain the B-inhibit pulse, both Party A and Party B begin speaking. Since the receive detector is inhibited, no reset pulses are generated. Instead, Party A's speech causes additional set pulses, further charging the inhibit circuit. While Party A is speaking, Party B stops speaking. Then party A pauses for the second time. Again, the receive detector is inhibited for approximately 100 milliseconds on the time line. In this example, Party B begins to speak before the 100 millisecond delay has elapsed. As soon as the delay is over, the receive detector is no longer inhibited, and Party B's speech causes reset pulses to be generated. The operating state is switched from transmit to receive (at approximately 650 milliseconds). The reset pulses begin to charge the inhibit circuit, but before the speech detectors are inhibited, Party A speaks at a moment when Party B is silent (at approximately 830 milliseconds). The operating state almost instantly switches to transmit mode, and once again the B-inhibit circuit is charged. Since the B-inhibit charge had not fully decayed, Party A inhibits the receive detector relatively quickly, in less than 100 milliseconds. When Party A stops speaking for the third time, the receive detector is again inhibited for approximately 100 milliseconds after the last set pulse from the speech detector. After the delay, Party B's speaking can cause reset pulses and switch the operating system to receive. This illustrative example shows that the inventive switch provides improved talk-down control for a loudspeaking telephone.

Keeping in mind that the useful control signal for the disclosed voice operated switch is produced at the output of the differential amplifier 28, certain predetermined spatial relationships of the microphones and loudspeaker may be necessary to obtain optimal switch performance. The speech microphone should be located substantially in front of the user, at a distance ranging from 10 to 40 centimeters. In the specific example relating to a mobile telephone for use in an automobile, the speech microphone may be attached to the driver's side sun visor for optimal performance. Both the loudspeaker and the noise microphone should be located at least five times as far from the user's mouth as is the speech microphones. These distances may be considerably reduced where, for example, some acoustic baffle is located between any of the devices. With appropriate baffling, the separation of the noise and speech microphones may be as small as twice the distance from the user's mouth to the speech microphone. For example, the noise microphone may be located under the passenger's seat, or the loudspeaker may be located in the back of the vehicle. In addition, the loudspeaker should be at least as far from the noise microphone as is the speech microphone from the user's mouth.

The disclosed voice operated switch is useful for applications other than mobile telephones, including workshops, loudspeaking intercoms, and telephone booths, for example. It is also highly effective when used to operate speech activated clay disc or "pigeon" firing apparatus at shooting ranges. While one specific embodiment has been described, it will be understood that many modifications of the switch are possible without departing from the scope of the invention.

What is claimed as the invention is:

1. A voice operated switch for opening and closing a circuit comprising:

a first input for receiving signals derived from speech;

a second input for receiving signals derived from noise;

independent amplifiers for amplifying said speech signals from said first input and said noise signals from said second input;

differential amplifier means for amplifying the difference between said speech and noise signals and for producing an output signal corresponding to said difference;

first detector means for generating a control pulse when said output signal is rising;

second detector means for generating a control pulse when said output signal is falling; and switch means for opening and closing said circuit in response to the control pulses from said first and second detector means.

2. The switch according to claim 1 further comprising:

frequency band pass means for limiting the frequencies of said speech and noise signals applied to said independent amplifiers;

independent first and second time constant circuits associated with said independent amplifiers; and independent rectifying means for rectifying said speech and noise signals before said speech and noise signals are applied to said differential amplifier means.

3. The switch according to claim 2 wherein:

said first detector means includes a first operational amplifier, said output signal.being applied through a third time constant circuit to the inverting input of said first operational amplifier;

said second detector means includes a second operational amplifier, said output signal being applied through a fourth time constant circuit to the non-inverting input of said second operational amplifier; and said switch means includes a Schmitt trigger circuit.

4. A voice operated switch for use in loudspeaking telephone apparatus, said apparatus including a speech microphone, a noise microphone, and a receiving channel for receiving signals from a distant source, said switch comprising:

an independent speech amplifier for amplifying speech signals from said speech microphone;

an independent noise amplifier for amplifying noise signals from said noise microphone;

differential amplifier means for amplifying the difference between said speech and noise signals and for producing an output signal corresponding to said difference;

first detector means for generating a set control pulse when said output signal is rising;

second detector means for generating a set control pulse when said output signal is falling;

switch means for closing a transmitting circuit in response to set control pulses from said first and second detector means;

a receiving amplifier for amplifying a received signal; and third detector means for generating a reset control pulse when said received signal is rising, said switch means being adapted to open said transmission circuit in response to a reset control pulse from said third detector means.

5. The switch according to claim 4 further comprising:

first inhibiting means for inhibiting generation of reset control pulses when any of said first and second detector means are generating set contol pulses; and second inhibiting means for inhibiting generation of set control pules when said third detector means is generating reset control pulses.

6. The switch according to claim 5 further comprising:

frequency band pass means for limiting the frequencies of said speech signals applied to said speech amplifier, of said noise signals to said noise amplifier, and of said received signal to said receiving amplifier;

first, second and third time constant circuits associated with said speech, noise and receiving amplifiers; and first, second and third rectifying means for rectifying said speech, noise and received signals.

7. The switch according to claim 6 wherein:

said first detector means includes a first operational amplifier, said output signal being applied through a fourth time constant circuit to the inverting input of said operational amplifier;

said second detector means includes a second operational amplifier, said output signal being applied through a fifth time constant circuit to the non-inverting input of said second operational amplifier;

said third detector means includes a third operational amplifier, said received signal being applied through a sixth time constant circuit to the inverting input of said third operational amplifier.

* * * * *